Patented Apr. 13, 1954

2,675,382

UNITED STATES PATENT OFFICE 2,675,382

TRIS(AMINOALKYL) HEXAHYDRO-TRIAZINES

Sidney Melamed, Philadelphia, Pa., assignor to Rohm & Haas Company, Philadelphia, Pa., a corporation of Delaware No Drawing. Application January 29, 1953,
Serial No. 334,103

9 Claims. (Cl. 260—247.5)

This invention relates to 1,3,5-tris(aminoalkyl)hexahydro-1,3,5-triazines and to a method for their preparation.

These compounds are prepared by reacting by condensing together formaldehyde and a diamine of the formula

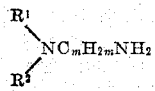

wherein $C_mH_{2m}$ is an alkylene chain of at least two carbon atoms, $m$ being an integer from two to six, and $R^1$ and $R^2$ represent individually hydrocarbon groups, including aliphatic, cycloaliphatic, aralkyl, and aryl groups, or taken together represent a saturated divalent aliphatic chain which with the nitrogen forms a heterocycle.

As individual groups $R^1$ and $R^2$ may be alkyl, such as methyl, ethyl, propyl, butyl, amyl (alkyl groups of two to five carbon atoms composing a preferred subclass), hexyl, octyl, nonyl, decyl, dodecyl, cetyl, or octadecyl, unsaturated aliphatic, such as allyl, methallyl, crotyl, 5,7,7,7-tetramethyl-2-octenyl, undecenyl, or oleyl, cycloaliphatic, such as cyclopentyl, cyclohexyl, dicyclopentenyl, dicyclopentanyl, methylcyclohexyl, or butylcyclohexyl, aralkyl, such as benzyl, methylbenzyl, butylbenzyl, or phenylethyl, and aryl, such as phenyl, naphthyl, cresyl, butylphenyl, or octylphenyl. Such group may also contain an unreactive functional group such as the ether linkage.

Typical diamines which may be used as initial materials include dimethylaminoethylamine, diethylaminoethylamine, dibutylaminoethylamine, diamylaminoethylamine, dioctylaminoethylamine, dodecylmethylaminoethylamine, octadecylmethylaminoethylamine, dicyclohexylaminoethylamine, dibenzylaminoethylamine, phenylmethylaminoethylamine, diphenylaminoethylamine, diallylaminoethylamine, morpholinoethylamine, pyrrolidinoethylamine, piperidinoethylamine, thiamorpholinoethylamine, (4 - methylpiperazino)-ethylamine, 3-methylmorpholinoethylamine, 3,5 - dimethylmorpholinoethylamine, diethylaminopropylamine, 2-dipropylamino-2-methylethylamine, dibutylaminobutylamine, morpholinobutylamine, pyrrolidinobutylamine, N-methylpiperazinopentylamine, diethylaminopentylamine, diethylaminohexylamine, morpholinohexylamine, piperidinohexylamine, 2-methylpiperidinopentylamine, 2,6-dimethylpiperidinopentylamine, and similar diamines in which one nitrogen is tertiary and the other is primary, the two aminonitrogens being separated by an alkylene chain of two to six carbon atoms. The simple alkylene chain may be replaced by a cycloaliphatic group, the cyclohexylene group being a specific case. Various methods for preparing diamines like those above have been shown in the chemical literature and are readily adaptable to the introduction of different tertiary amine groups and different alkylene chains or the equivalent cycloalkylene group. Other methods for the preparation follow conventional procedures for introducing these parts in the diamine structure. Some of the diamines have been made available by chemical manufacturers. Others can be prepared by methods such as are shown in J. Amer. Chem. Soc. 63, 156; 66, 725; 67, 686; 68, 1559, and 72, 81.

Formaldehyde may be used in the form of an aqueous 30% to 50% solution or in the form of a reversible polymer or as a mixture of these forms.

The condensation reaction is conveniently carried out in the presence of water or of an inert organic solvent. Benzene, toluene, xylene, naphtha, and the like are particularly useful solvents, as they assist in removal of water from the reaction mixture.

Temperatures of reaction may vary from about 0° to 150° C. Usually the reaction is started at a low temperature and completed with heating, as under reflux, with removal of water. The reaction product is then collected, most conveniently as a residue obtained on stripping off solvent and volatile materials. In the cases of the smallest groupings the product may be distilled under low pressures.

The compounds of this invention are fungicides and antiviral agents. They are also useful as plasticizers and chemical intermediates, yielding, for example, interesting quaternary ammonium derivatives.

Further details of the preparation of tris(aminoalkyl) hexahydro-1,3,5-triazines are shown in the following illustrative examples. Parts are by weight.

Example 1

A portion of 43.2 parts of 3-morpholinopropylamine is cooled in an ice-bath and thereto is added 24.3 parts of aqueous 36.6% formaldehyde solution, which has also been chilled to about 0° C. The reaction starts promptly with evolution of heat. To the reaction mixture is added 130 parts of benzene. The resulting mixture is heated under reflux with separation and removal of water by azeotropic distillation. The reaction mixture is left standing for about 16 hours. It is filtered and the filtrate is evaporated to remove benzene. The residue is stripped at 130° C./0.5 mm. for 40 minutes. There is obtained an oil, which corresponds in composition to N,N',N''-tris(morpholinopropyl)hexahydro-1,3,5-triazine. It has a refractive index at 25° C. of 1.5097.

An aqueous 1% dispersion of this compound is not phytotoxic to tomato plants and completely inhibits germination of spores of *Macrosporium sarcineforme* and *Sclerotinia fructicola*.

Example 2

A portion of 65 parts of 2-morpholinoethylamine is cooled in an ice-bath and treated with 45 parts of aqueous 37% formaldehyde solution. Reaction starts promptly with evolution of heat. Addition is made of about 150 parts of benzene and the mixture is heated under reflux with removal of water through azeotropic distillation and return of benzene. The reaction mixture is cooled and filtered. Benzene is distilled off and the residue is stripped by heating it to about 120° C. at 0.5 mm. pressure for about 40 minutes. The residue corresponds in composition closely to that for N,N',N'' - tris(morpholinoethyl)hexahydro-1,3,5-triazine. It is a colorless oil having a refractive index of 1.5150 at 25° C.

Example 3

In the same way there are reacted 44 parts of dimethylaminoethylamine and 42 parts of aqueous 37% formaldehyde solution. The mixture is heated with a low boiling naphtha with removal of water azeotropically. After distillation of the naphtha the residue is stripped by heating at about 130° C./1 mm. There results a colorless oil having a nitrogen content of 28%. This corresponds to the nitrogen content of N,N',N''-tris(dimethylaminoethyl)hexahydrotriazine.

Example 4

In the same way 42 parts of 3-(dimethylamino)propylamine and 25 parts of aqueous 37% formaldehyde solution are mixed in the cold. The reaction mixture is then heated with benzene to remove water. The product, collected as a residual oil and stripped at about 130° C./1 mm., corresponds in composition to N,N',N''-tris(dimethylaminopropyl)hexahydro - 1,3,5 - triazine. It has a refractive index at 25° C. of 1.4760.

Example 5

There is substituted for the above starting diamine an equivalent weight of diethylaminopropylamine. The reaction is carried out as above to yield an oil which corresponds in molecular weight and composition to N,N',N''-tris(diethylaminopropyl)hexahydro - 1,3,5 - triazine. It has a refractive index at 25° C. of 1.4741.

Example 6

The above procedure is followed starting with an equivalent weight of di-n-amylaminopropylamine. The product obtained is an oil corresponding in composition to N,N',N''-tris(di-n-amylaminopropyl)hexahydro - 1,3,5 - triazine. It has a refractive index of 1.4700 at 25° C.

In the same way there may be taken other dialkylaminoalkylamines to react with formaldehyde to yield corresponding tris(dialkylaminoalkyl)hexahydro-1,3,5-triazines. The subclass of compounds in which the N,N-dialkyl groups contain two to five carbon atoms is one of considerable value and utility. All of the compounds have a relatively high nitrogen content and are basic. They may thus be used where basic properties are required. They exhibit bactericidal and antiviral properties. Some are insecticidal.

Example 7

In the same way there are reacted 4-(diethylamino)-1-methylbutylamine and formaldehyde to yield N,N',N''-tris(4-diethylamino-1-methylbutyl)hexahydrotriazine. This compound has a refractive index of 1.4760 at 25° C.

In place of the above 4-amino-1-methylbutylamine there may be used other amines having branched alkylene groups between the two nitrogens. Likewise, larger alkylene groups may be used, such as pentylene or hexylene, with no essential change in procedure. Also, the dialkyl portion of the starting diamine can be made as large as is desired. With such alkyl groups containing eight to eighteen or more carbon atoms there develops surface activity as exhibited, for example, in the acid salts of the polyamine products or in quaternary derivatives.

The compounds are not limited to those having identical alkyl groups as $R^1$ and $R^2$ in the grouping $R^1R^2N(CH_2)_m$— or to those having merely alkyl groups as $R^1$ and $R^2$. These may be replaced with other hydrocarbon radicals. For example, dicyclohexyl aminoethylamine reacts with formaldehyde to form N,N',N''-tris(dicyclohexylaminoethyl)hexahydrotriazine; dibenzylaminopropylamine reacts to form N,N',N''-tris(dibenzylaminopropyl)hexahydrotriazine; N - phenyl-N - methylaminopropylamine reacts to form N,N',N''-tris(N - phenyl-N-methylaminopropyl)-hexahydrotriazine; diallylaminoethylamine reacts to form N,N',N''-tris(diallylaminoethyl)hexahydrotriazine; etc.

Closely allied to these products in which $R^1$ and $R^2$ appear as separate hydrocarbon groups are the hexahydrotriazines in which $R^1$ and $R^2$ together form an alkylene chain which is a part of a heterocycle, as in pyrrolidino- and piperidino-substituted compounds.

Example 8

There are mixed 32 parts of pyrrolidinopropylamine and 22 parts of aqueous 37% formaldehyde solution. Benzene is added to the mixture, which is then heated to refluxing temperatures with azeotropic removal of water. The reaction mixture is stripped of volatile materials at 140° C./1 mm. to give an oil, which corresponds in composition to 1,3,5-tris(pyrrolidinopropyl)hexahydro-1,3,5-triazine. The product contains 20% of nitrogen (theory 20%) and yields 21% formaldehyde.

Example 9

Reaction of 35 parts of piperidinopropylamine and 20 parts of aqueous 37% formaldehyde as in the previous example gives 1,3,5-tris(piperidinopropyl)hexahydro-1,3,5-triazine, which is collected as an oil containing 18.1% of nitrogen (theory 18.2%) and yielding on digestion with phosphoric acid 19.1% of formaldehyde (theory 19.5%).

The divalent group forming the heterocycle with the amino nitrogen is not confined to hydrocarbon groups. The divalent, saturated chain formed by $R^1$ and $R^2$ may contain a heteroatom, such as oxygen, sulfur, or tertiary nitrogen. Morpholine and thiamorpholine supply the first two, while N-substituted piperazines, such as N-alkylpiperazines, can be used for forming compounds having nitrogen in the divalent chain.

Example 10

There are mixed 28.6 parts of 2-(N-methylpiperazino)ethylamine and 18 parts of aqueous 36% formaldehyde solution. The mixture is treated with benzene and heated under reflux with separation of water. Benzene is distilled off and the residue is stripped by heating to 140° C./1 mm. The product, an oil having a refractive index at 24° C. of 1.5203, corresponds in composition to 1,3,5-tris(N-methylpiperazinoethyl)-hexahydro-1,3,5-triazine.

*Example 11*

The above procedure is repeated starting with an equivalent amount of 3-(N-methylpiperazinopropyl)amine. The product is 1,3,5 - tris(N-methylpiperazinopropyl)hexahydro - 1,3,5 - triazine. It has a refractive index at 26° C. of 1.5094.

*Example 12*

By the same procedure there are reacted 34.4 parts of 3-(3,5-dimethylmorpholino)propylamine and 18 parts of aqueous 36% formaldehyde solution. The product is an oil, corresponding in composition to 1,3,5-tris(3,5-dimethylmorpholinopropyl)hexahydro-1,3,5-triazine. It has a refractive index at 26° C. of 1.4923.

*Example 13*

There are reacted as above 35 parts of 5-morpholinopentylamine and 18 parts of aqueous 37% formaldehyde solution. The product is 1,3,5-tris-(5-morpholinopentyl)hexahydro - 1,3,5 - triazine. It has a refractive index of 1.5020 at 25° C.

The product made from 6-morpholinohexylamine is 1,3,5-tris(6-morpholinohexyl)hexahydro-1,3,5-triazine. It differs from the above pentyl derivative only in matter of degree.

*Example 14*

There are reacted together as above 32 parts of 4-morpholinobutylamine and 19 parts of aqueous 37% formaldehyde solution. The product is 1,3,5-tris(4-morpholinobutyl)hexahydro-1,3,5-triazine, an oil having a refractive index of 1.5052 at 25° C.

When compounds of this invention are injected into eggs in which chick embryos have been inoculated with a virus, they prolong the life of the embryo. The triazines having heterocyclic N-aminoalkyl substituents are particularly effective as anti-viral agents and of these the morpholino derivatives are of greatest interest.

The compounds of this invention are conveniently summarized by the formula

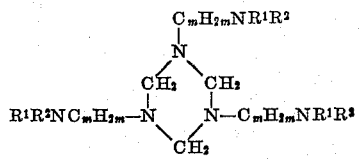

where $C_mH_{2m}$ is an alkylene chain of at least two carbon atoms between nitrogen atoms, $m$ being an integer from two to six, and $R^1$ and $R^2$ are hydrocarbon groups when taken individually or together represent a divalent, saturated aliphatic chain of five to six carbon atoms, which jointly with the adjacent nitrogen forms a monocyclic heterocyclic amino group.

I claim:

1. As new chemical compositions, compounds of the structure

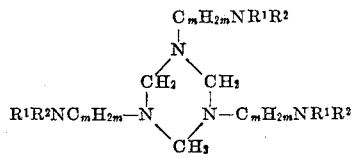

wherein $C_mH_{2m}$ is an alkylene chain of at least two carbon atoms between nitrogen atoms, $m$ being an integer from two to six, and $R^1$ and $R^2$ are hydrocarbon groups when taken individually and when taken together represent a saturated divalent aliphatic chain of five to six atoms, which jointly with the adjacent nitrogen forms a monocyclic heterocyclic amino group.

2. As new chemical compositions, 1,3,5-tris-(morpholinoalkyl)hexahydro - 1,3,5 - triazines in which the alkyl group contains two to six carbon atoms.

3. As a new chemical compound, 1,3,5-tris-(3-morpholinopropyl)hexahydro-1,3,5-triazine.

4. As a new chemical compound, 1,3,5-tris-(2-morpholinoethyl)hexahydro-1,3,5-triazine.

5. As a new chemical compound, 1,3,5-tris(5-morpholinopentyl)hexahydro-1,3,5-triazine.

6. As new chemical compositions, 1,3,5-tris-(dialkylaminopropyl)hexahydro-1,3,5-triazines in which the alkyl group contains two to five carbon atoms.

7. As a new chemical compound, 1,3,5-tris-(diethylaminopropyl)hexahydro-1,3,5-triazine.

8. As a new chemical compound, 1,3,5-tris-(diamylaminopropyl)hexahydro-1,3,5-triazine.

9. As new chemical compositions, compounds of the structure

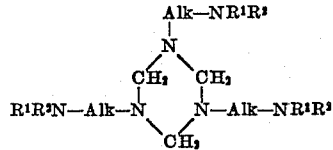

wherein —Alk— is an alkylene chain of two to six carbon atoms with at least two carbon atoms between nitrogen atoms and $R^1$ and $R^2$ are alkyl groups of two to five carbon atoms.

No references cited.